US008505195B2

(12) United States Patent
Sullivan

(10) Patent No.: US 8,505,195 B2
(45) Date of Patent: Aug. 13, 2013

(54) TERMINATING SYSTEMS AND TOOLS FOR WALL JACKS

(76) Inventor: Robert Sullivan, Simi Valley, CA (US)

( * ) Notice: Subject to any disclaimer, the term of this patent is extended or adjusted under 35 U.S.C. 154(b) by 674 days.

(21) Appl. No.: 12/485,724

(22) Filed: Jun. 16, 2009

(65) Prior Publication Data

US 2009/0307903 A1 Dec. 17, 2009

Related U.S. Application Data

(63) Continuation-in-part of application No. 12/140,989, filed on Jun. 17, 2008.

(51) Int. Cl.
*B23P 19/00* (2006.01)
*H01R 43/042* (2006.01)

(52) U.S. Cl.
USPC .............. 29/751; 29/33 M; 29/566.4; 29/747; 29/748; 29/758

(58) Field of Classification Search
USPC .............. 29/751, 33 M, 566.4, 747–750, 753, 29/758, 854, 857, 861; 30/91.2, 178, 179, 30/229, 233, 260, 293; 72/409.14, 453.01, 72/453.16, 456
See application file for complete search history.

(56) References Cited

U.S. PATENT DOCUMENTS 4,106,195 A * 8/1978 Berg .............................. 30/293
6,807,728 B2 * 10/2004 Griffin et al. .................. 29/751

OTHER PUBLICATIONS

Third Office Action issued for Chinese Patent Application No. 200910163921.9, mailed by the SIPO on Dec. 19, 2012.

* cited by examiner

*Primary Examiner* — Thiem Phan
(74) *Attorney, Agent, or Firm* — Arent Fox LLP

(57) ABSTRACT

Disclosed is tool having a first-class double lever including a first lever and a second lever fixed by a pivot, a platform coupled to an end of the first lever and configured to support a wall jack and a blade holder coupled to an end of the second lever, the blade holder being adjustable to move an attached blade linearly in a direction towards the platform.

8 Claims, 10 Drawing Sheets

TERMINATING SYSTEMS AND TOOLS FOR WALL JACKS

CROSS-REFERENCE TO RELATED APPLICATION(S)

This patent application is a continuation in part of patent application Ser. No. 12/140,989, entitled "Terminating System and Tools for Wall Jacks" and filed on Jun. 17, 2008, and which is herein incorporated by reference.

FIELD

The present disclosure relates generally to the field of making electrical wiring connections in telecommunication connector blocks or terminals, and more specifically, to terminating tools for wall jacks.

BACKGROUND

Typically, Insulation Displacement Connectors (IDC), known as wall jacks, are terminated by use of a punch-down tool. Known punch-down tools have fixed types of blades and therefore each works for one specific type of wall jack. However, there are numerous types of wall jacks, each with a different geometry. Geometry of wall jacks may differ from one another in many aspects. For example, within a wall jack, the dimensions between the housings for each and/or every set of wires could be different. Furthermore, such tools are designed for cutting wires, and not for connecting wires.

Additionally, many of the existing punch-down tools are not easy to use. For example, when a punch-down tool is loosely held in one hand, and the wall jack is held in the other hand, the angle of termination can vary from a few degrees to hundreds of degrees off center from an optimal termination. As such, if the user is off center, the termination will be degraded and a poor data signal will require the technician to re-terminate the wire. Furthermore, during the termination process the technician is exposed to the possibility of missing the jack and pushing the sharp edge of the terminating blade into his hand and possibly injuring himself or damaging the wall jack. Such punch-down tools impact the jack in a fast action, and as such, they do not allow the technician to slowly adjust the tool and the jack for optimal termination. Additionally, the force of the termination cannot be controlled due to the technician holding the tool in one hand and the wall jack in the other hand. The technician may hold the jack against a wall or floor, but this will increase the chances of scuffing or damaging a wall or floor.

With many of the current tools, the technician does not have a platform to hold the jack safely and securely to make the optimal termination on a wall jack. Typically, a wire will be protruding from a wall outlet. In an optimal installation the wire will have sufficient length for the technician to terminate the wire to the wall jack. However the length of wire protruding from the wall may be very short and therefore may not allow the technician much operating length to make a proper impact termination.

There are some rigid systems that can securely hold certain wall jacks in place, allowing the technician to terminate up to several wires simultaneously. However, the pitfall of those systems is that they require seating blades that are fixed and/or are molded into a plastic holder (or a holder made of similar type of material in kind). Such systems work for only specific type of wall jacks. In such systems, the blade geometry is fixed, the actuation length is fixed, and the receive end is fixed and cannot be modified for other wall jacks with different geometric features. Furthermore for certain type of wall jacks, simply there may be no such tools available that would be compatible.

There are some tools which have multiple blades. However, in such tools, all blades are permanently mounted to a fixture. As such, the blades cannot be replaced individually. If one blade becomes damaged, one must replace all blades at once, which may be costly.

In some of the above mentioned tools, a user has no control over the force of the termination, thus the technician cannot control for the optimal seating of the wire in the jack for varying types of wire gauges. Additionally, the throw or termination length of the system is defined by the tool for one type of wall jack. The length of travel for different wire diameters or other different types of wall jacks can not be changed, and the blade height is fixed and cannot be adjusted. Furthermore, the length of the tool is fixed and cannot be adjusted easily for dissimilar types of wall jacks.

SUMMARY

In one aspect of the disclosure, a tool comprises of an adjustable platform configured to support a wall jack; and a blade configured to engage a wire with the wall jack while the wall jack is being supported in the adjustable platform.

In another aspect of the disclosure, a tool comprise a platform configured to support a wall jack; a blade configured to engage a wire with the wall jack while the wall jack is being supported in the platform; and a blade holder configured to hold at least one of a plurality of blade types.

In another aspect of the disclosure, a method of engaging a wire with a wall jack, comprises of adjusting a platform of a tool to support a wall jack; and engaging a wire with the wall jack using a blade while the wall jack is supported on the platform.

In another aspect of the disclosure, a method of engaging a wire with a wall jack, comprises of placing a wall jack on a platform of a tool; replacing a blade a first blade with a second blade in a blade holder of the tool; engaging a wire with the wall jack with the blade while the wall jack is placed on the platform; wherein the first blade comprises a first blade type, and the second blade comprises a second blade type different than the first blade type.

In another aspect of the disclosure, a tool comprises of means for supporting a wall jack, wherein the means for supporting the wall jack is adjustable; and means for engaging a wire with the wall jack while the wall jack is being supported.

In another aspect of the disclosure, a tool comprises of means for supporting a wall jack; and means for engaging a wire with the wall jack while the wall jack is being supported, wherein the means for engaging a wire is replaceable.

It is understood that other aspects of the present disclosure will become readily apparent to those skilled in the art from the following detailed description, wherein it is shown and described only exemplary aspects of the disclosure by way of illustration. As will be realized, the disclosure includes other and different aspects and is several details are capable of modification in various other respects, all without departing from the spirit and scope of the present disclosure. Accordingly, the drawings and detailed description are to be regarded as illustrative in nature and not as restrictive.

BRIEF DESCRIPTION OF THE DRAWINGS

Various aspects of the present disclosure are illustrated by way of example, and not by way of limitation, in the accompanying drawings, wherein.

DETAILED DESCRIPTION

The detailed description set forth below in connection with the appended drawings is intended as a description of various aspects of the present disclosure and is not intended to represent all ways in which the present disclosure may be practiced. The detailed description may include specific details for the purpose of providing a thorough understanding of the present disclosure; however, it will be apparent to those skilled in the art that the present invention may be practiced without these specific details. In some instances, well-known structures and components are summarily described and/or shown in block diagram form in order to avoid obscuring the concepts of the present disclosure.

In general, the aspects described below present tools and methods of connecting and terminating a variety of wires for a variety of wall jacks. While these aspects are described as operating in a manual fashion, it should not be construed that all aspects are in any way limited to a manual implementation. Parts or some of the aspects may be enhanced to work in an automated or semi-automated manner, and/or in a manner that takes advantage of hydraulic, electro magnetic force, both battery (DC) and generator supplied (AC), or other known types of implementation.

Figure 1:
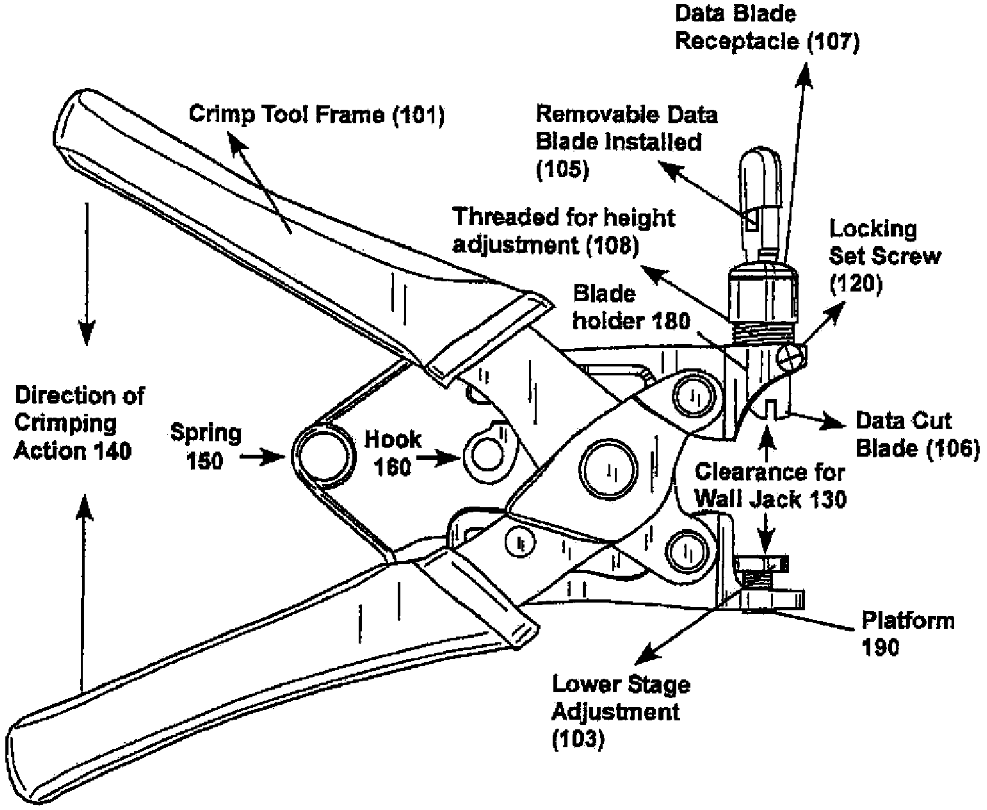
FIG. 1 is a diagram depicting an adjustable tool for connecting and/or terminating a variety of wires to a variety of wall jacks.

FIG. 1 is a diagram depicting an adjustable wire connecting/terminating tool for wall jacks. It comprises of a movable blade receptacle 107 with a blade 105 inserted in a blade holder 180, and an adjustable lower stage adjustment 103, attached to a platform form 190. The platform 103 provides a means for supporting at least one wall jack, and the blade 105 provides a means for engaging at least one wire to the wall jack. The handle 101 is for moving the blade 105 to seat and terminate a wire in a wall jack via the tip of the blade 106 at an optimal adjusted setting 130. The threaded portion 108 of the data blade receptacle 107, the locking set screw 120, and the threaded portion of the lower stage adjustment 103 lock the data blade 105 and lower stage 103 in place, respectively. The data blade 105 or data blade receptacle 107 is mounted to the blade holder 180. The blade holder 180 is adjustable and can move the blade 105-106 linearly in a direction towards the platform 190 which comprises of an adjustable lower stage 103, via the crimp tool frame 101 by a crimping action 140.

Figure 5:
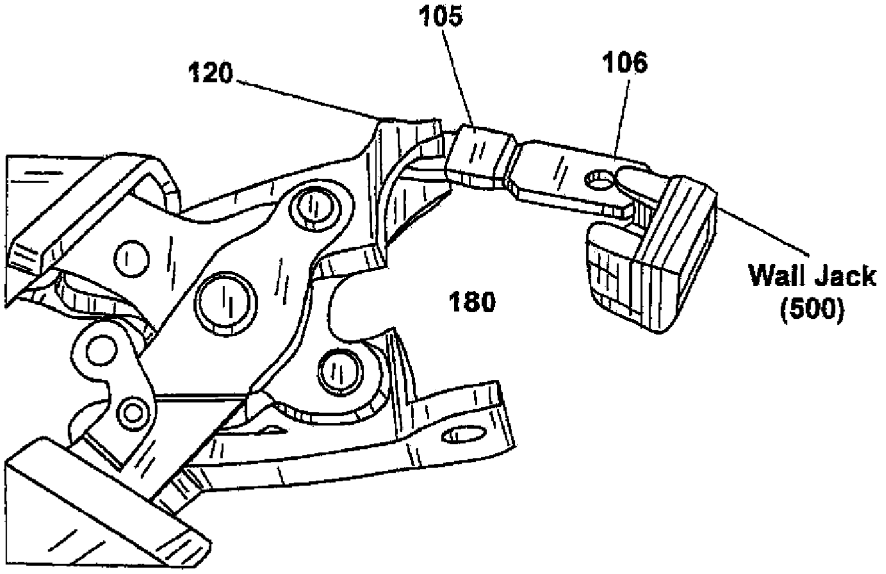
FIG. 5 is an illustration of an adjustable termination blade mounted to the tool of FIG. 1, capable of rotating outward.

The lower stage adjustment 103 of the platform 190 and the data blade 105-106 attached to the blade holder 180 are in alignment to seat numerous different types of wall jacks. The data blade receptacle 107 has the ability to be adjusted in a linear and rotational direction via the blade holder 180. In one aspect, the blade holder 180 uses locking set screw 120 to rotate and lock the blade 105 in various degrees. FIG. 5 shows an adjustable blade 105-106 (without a blade receptacle 107) next to a wall jack 500 that is rotated via the screw 120 of the blade holder 180.

Figure 2:
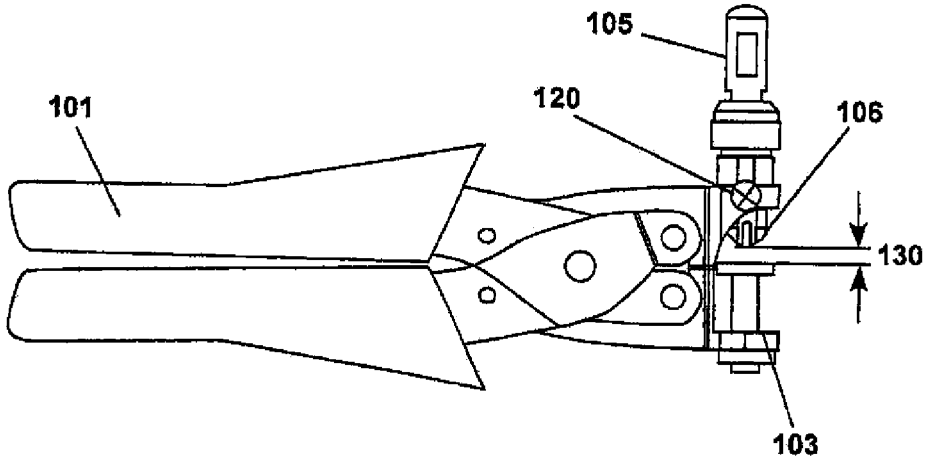
FIG. 2 is an illustration of the tool of FIG. 1, with an adjustable opening between the termination blade and the platform.
Figure 3:
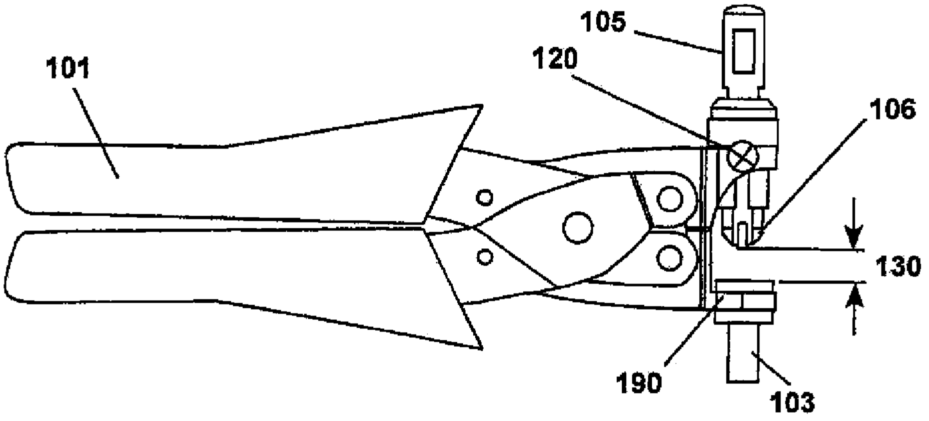
FIG. 3 is another illustration of the tool of FIG. 1, with an adjustable opening between the termination blade and the platform.
Figure 4:
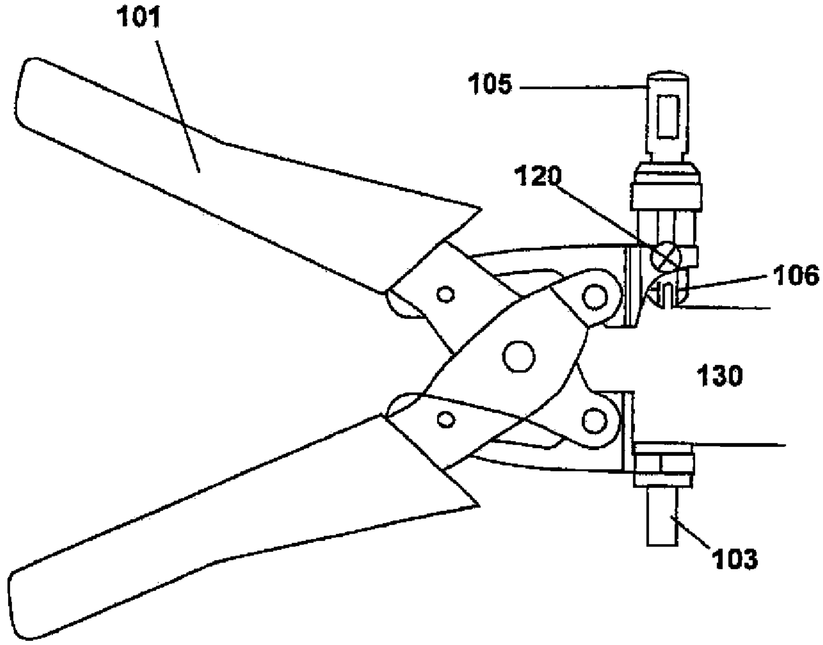
FIG. 4 is yet another illustration of FIG. 1, with an adjustable opening between the termination blade and the platform.

The tool of FIG. 1 may be pre-set for a preselected wall jack, such as the wall jack 500 shown in FIG. 5. Once the tool has been adjusted for an optimal seating of a wire, the setting is temporarily locked in place. There are many ways that one can determine an optimal height 130. For example, one can use a chart to look up the height of a specific wall jack, and then open the tool to that level. Also a ratcheting mechanism with stops can be used in which the tool is first opened up to a maximum height 130, and then slowly it is closed to fit the height of the desired wall jack. No matter what technique is used, there are various ways for adjusting the tool of FIG. 1. For example, the blade 105-107 can be moved up using the screw set 120 as shown in FIG. 2. Alternatively, the platform 190 through the lower stage adjustment screw 103 can be lowered as shown in FIG. 3. Furthermore, additional clearance for wall jack 130 can be obtained by opening the crimp tool frame handle 101, as shown in FIG. 4.

Figure 6:
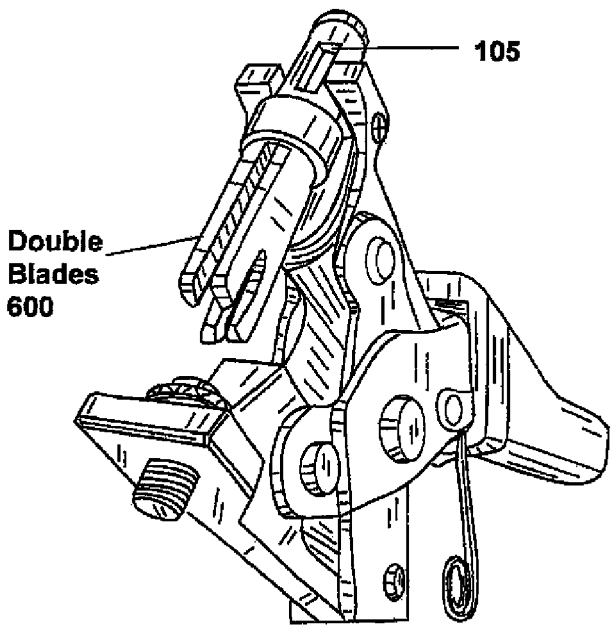
FIG. 6 is an illustration of an adjustable termination blade comprising a plurality of blades, mounted to the tool of FIG. 1.

The data blade 105 of FIG. 1 may be a blade either with or without cutting ends 106. When a blade 105 with a cutting end 106 is used, it will terminate the wire, and when a blade 105 with no cutting end is used, it will simply connect (i.e. jump) the wire. Using the tool of FIG. 1, the technician can accurately, slowly, and in a controlled manner terminate or connect a variety of wires in a variety of wall jacks. The tool of FIG. 1 can return to its initial open position using the Spring 150. Furthermore, it can be locked in a specific position using a hook 160. The blade 105-106 could comprise of a plurality of blades 600 as shown in FIG. 6.

In one aspect, a method of operating the tool of FIG. 1 comprises of the following steps. First a technician will choose an appropriate type of data blade 105-106, and inserts it into the blade holder 180 that is capable of holding a wide variety of blades. The technician may choose to use the cut end 106 or the non cutting end of the data blade, or any suitable desired blade. Furthermore, the technician may choose any type wall jack configuration. For example, the technician may choose a right angle wall jack, a 4-pair ganged wall jack, or a straight wall jack. One type of wall jack 500 has been shown in FIG. 5.

The technician will then place the wall jack onto the tool of FIG. 1, over the platform 190 on the lower stage adjustment 103. Then the technician adjusts the length of the cutting data blade 105-106 via the screw 120 of the blade holder 180 and/or adjusts the lower seating adjustment 103 of the platform 190, and/or moves the crimp tool frame 101 (as was shown in FIGS. 2-4) to a point where the blade 106 would seat and cut the wire in the wall jack at the sweet spot of the IDC without damage to the wall jack. The technician will not set the blade 106 too low or too deep. If the blade 106 is too deep the blade 106 will wear out prematurely and the wall jack gets damaged. The technician will not adjust it too large, otherwise he/she could miss the sweet spot of the DC and therefore the wire will not seat properly. After the proper setting for a particular wall jack is achieved, the technician can lock this setting in place using locking set screw of 120 or lower stage adjustment screw 103. The lower stage adjustment screw 103 can be further secured with a locking fastener such as a nut or a set screw (not shown).

In another aspect of the disclosure, once the tool of FIG. 1 has been calibrated, the technician places a wire into the wall jack. He will then place the wall jack onto the tool and causes the data blade 106 to engage the wire in the wall jack for the purpose of connecting or terminating the wire in a controlled manner. The wire may be cut off or may be connected (jumped) depending on the type of data blade 105 used.

According to another aspect, the overall operation to be preformed is as follows. First, the technician will decide on the type of data blade 105-106 to use, then the technician will take a common commercially available wall jack such as the wall jack 500 shown in FIG. 5. He will place the wall jack on the lower stage adjustment 103 of the platform 190 of the tool of FIG. 1. He will then insert an appropriate blade 105 into the blade holder 180, and will then adjust both the data blade 105-106 and lower platform 103 as was shown in FIGS. 2-4. In addition, the crimp tool frame 101 may be moved. Once he has determined the optimal setting dimension, the technician will lock in the desired setting using locking set screw 120 of the blade holder 180 and the lower stage adjustment 103 of the platform 190. The technician will then take said communication wires to be terminated (typically these wires would be found protruding from a wall), and lace one or two of the wires onto the wall jack in a predetermined wire schematic. Once the wires are loosely laced, the technician will take said tool and place the wall jack onto the mounting platform of said tool. The technician will squeeze, or otherwise move the handle of the tool 101 towards the direction of crimping 140, causing the data blade 105-106 to move towards the wall jack. The technician will continue to slowly move the data blade 105-106 into the wall jack and terminate or just jump/connect the wire at the preset point. The wall jack will not be damaged and the wire will be in its sweet spot on the wall jack. The technician can view the alignment of the blade 106 and the wire receiver or contact point of the wire. The wall jack and the data blade 106 are designed to mate together for optimal seating of the wire in an IDC as well as cutting off the wire. The geometry of IDC is important for both connecting and cutting off the wire protrusion. Once the alignment of the blade 106 and the wall jack are in alignment, the technician can continue to apply pressure to connect or terminate the wire in the wall jack.

In another aspect the technician may use a force indicator to connect or terminate the wire in the wall jack. The technician may set a predetermined stop to stop the motion of the tool at a predetermined position. The technician then releases the tool of FIG. 1, which allows the tool to open up to the initial starting position via spring 150. If the blade 106 is still held onto the wall jack, the technician can rotate the data blade 106 pulling the wall jack off the blade 106 in a slow and controlled manner. If the blade 106 wears out, the technician can readily remove the old blade 106 from the blade holder 180, and can insert another blade in the blade holder 180. The blade holder 180 is capable of holding various types of blades.

In another aspect, the technician seats the wire using a tool that can be preset to a predetermined force by an adjustment of a spring return mechanism 150 or a system whereby a spring force mechanism measures the force and reads out the force for an optimal seating. The technician can also set a mechanical stop to stop the action of the tool to various preset lengths for different types of wall jacks. Such a movement can be locked in place via a hook 160 as shown in FIG. 1. Also the distance between the platform and the data blade 130 can be adjusted for large or small wall jacks. If the blade 106 wears out, it can be easily replaced without having to replace any other parts of the tool. The blade 105-106 can be replaced at the blade holder 180, individually and at a low cost. A technician can preset the distance between the blade and the lower platform 130 by comparing the setting to a predetermined gauge, measurement, or other settings provided by the wall jack manufacture for an optimal seating of the wire in the wall jack. For example, the technician could look at a chart, or read the measurements from the markings that may have been printed on the wall jack by the wall jack manufacturer. The technician then can set the blade 105-106 or tool actuation 140 and be ready to connect or terminate wires in a wall jack. The wall jack manufacturers could provide one of the best setting and charts for different wire diameters.

Figure 7:
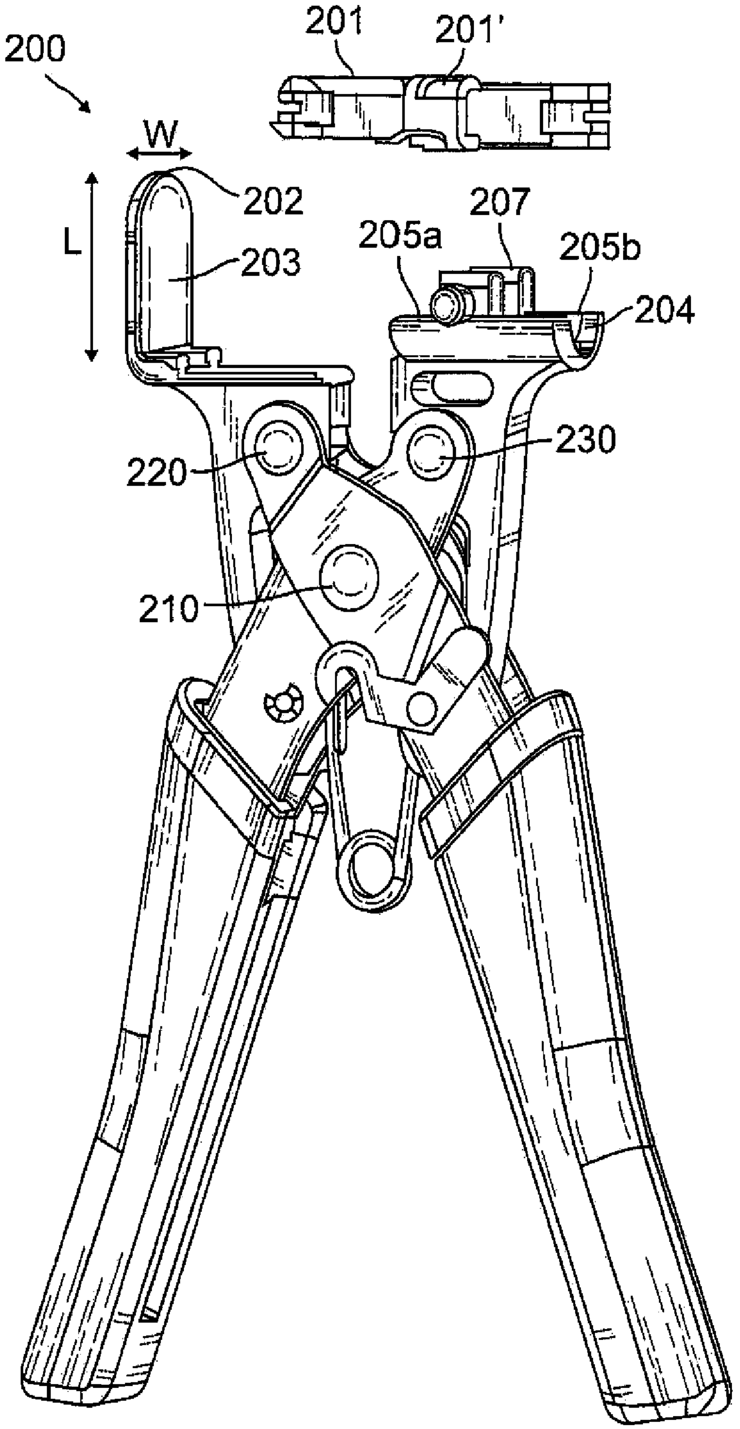
FIG. 7 is a perspective view of another configuration of an adjustable tool.

FIG. 7 is a perspective view of another configuration of an adjustable tool 200. As shown in FIG. 7, the adjustable tool 200 includes a first-class double lever connected at pivot 210 (which acts as the fulcrum), with a crimping stand/platform 202 on an end of one lever 220 and a blade holder 204 on a corresponding end of the other lever 230. The crimping platform 202 is fixed in position on the lever 220 and provides a wide surface area 203 for allowing multiple types of wall jacks to be held flush with the wide surface area 203. The crimping platform 202 may be configured with an adapter shoe or a sticky shoe that slides or attaches over the platform 202 for fixing a wall jack. In one configuration, the crimping platform 202 may be about 1.0-1.5 inches in length by about 0.75-1.25 inches in width. In this configuration, the blade holder 204 is formed in the shape of a half cylinder and provides two separate recess portions 205*a*, 205*b* within the half cylinder for allowing the blade 201 to be fixed in two different and distinct positions. The blade 201 includes cylindrical portion 201' for fitting securely into one of the recess portions 205*a*, 205*b*. Between the recess portions 205*a*, 206*b* is a non-recessed locking portion 207 for locking the blade 201 into the blade holder 204.

Figure 8:
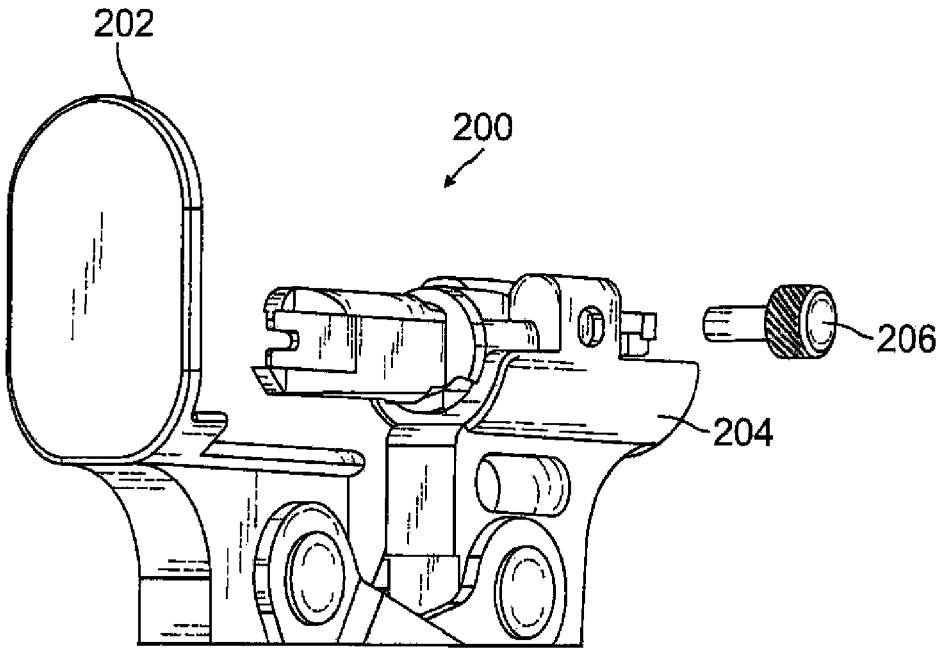
FIG. 8 is a perspective view of blade portion of the adjustable tool of FIG. 7.

FIG. 8 is a perspective view of the blade holder 204 of the adjustable tool 200 of FIG. 7. As shown in FIGS. 7 and 8, a pole lock 206 locks the blade 201 in place within the locking portion 207 of the blade holder 204. Other different blade holder positions and locking methods would relate to other different crimping positions.

Figure 9:
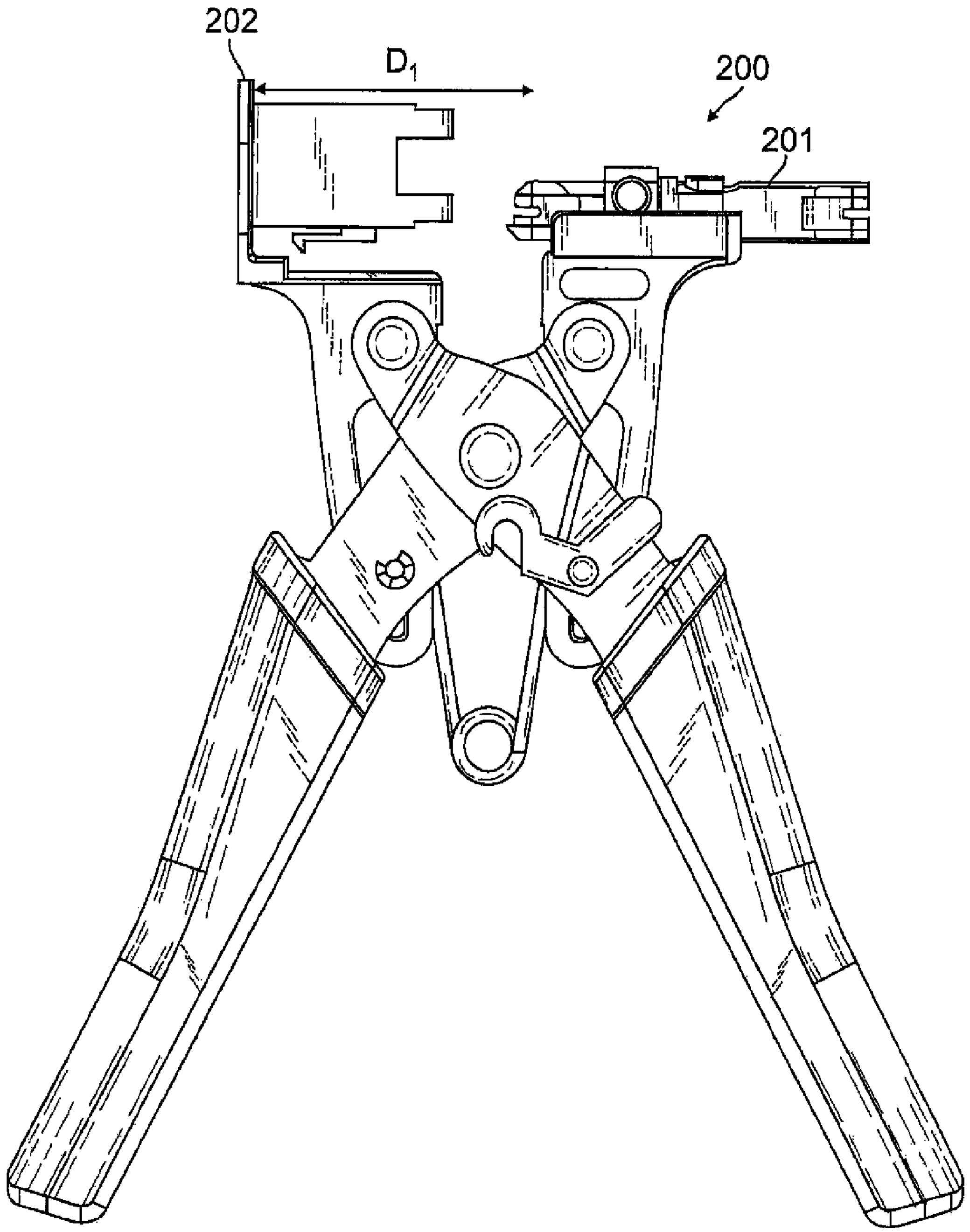
FIG. 9 is a side view of the adjustable tool of FIG. 7 showing a first blade position.
Figure 10:
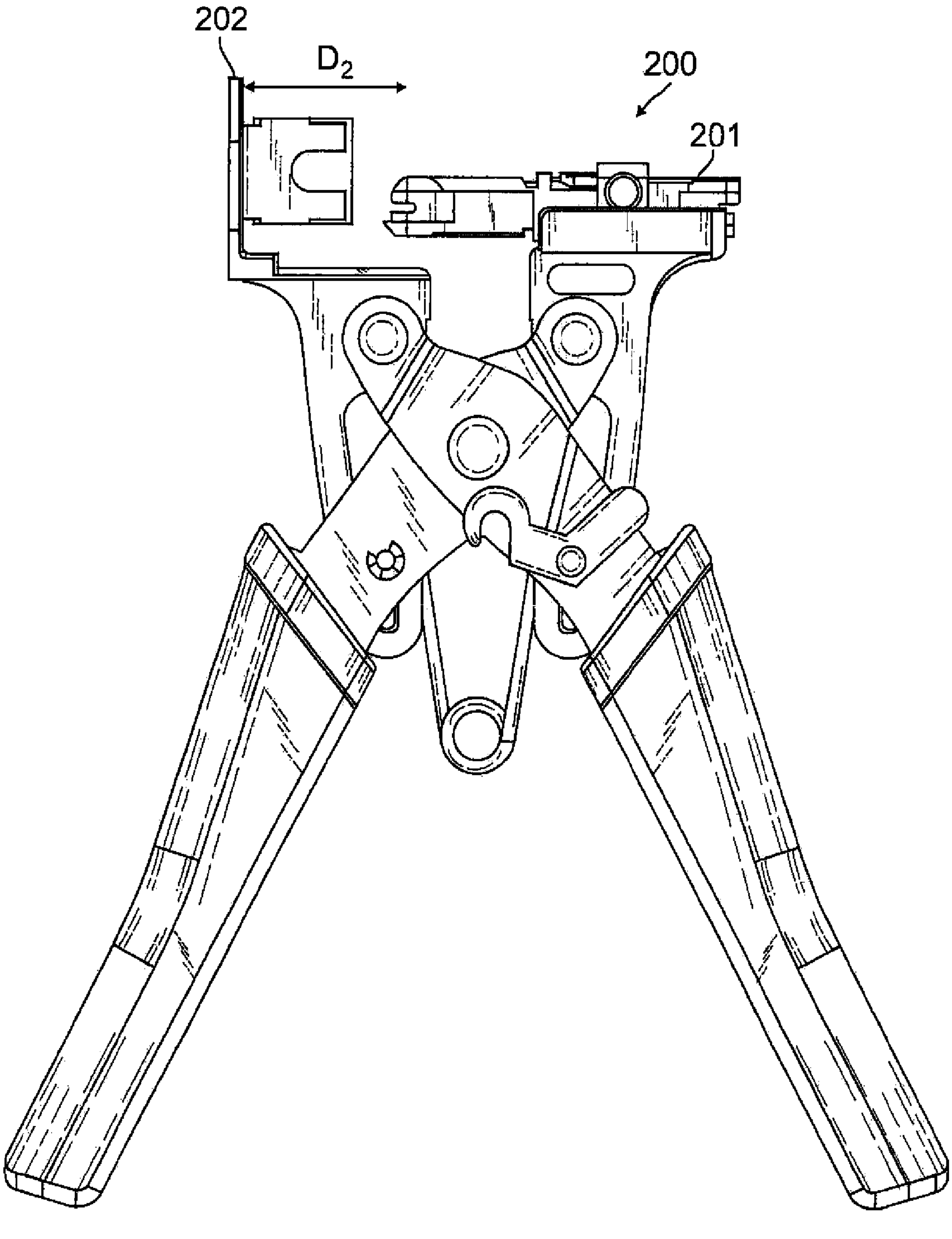
FIG. 10 is a side view of the adjustable tool of FIG. 7 showing a second blade position.

FIG. 9 is a side view of the adjustable tool 200 of FIG. 7 showing a first blade position. FIG. 10 is a side view of the adjustable tool 200 of FIG. 7 showing a second blade position. As shown in FIG. 9, the blade 201 may be locked into a first position in the blade holder 204, with the blade cylindrical portion 201' located within the second recess 205*b* such that the blade is about 0.75 inches±0.25 inches ($D_1$) from the crimping platform 202. In the first position, the blade 201 is located further from the crimping platform 202 and therefore may operate on taller wall jacks. As shown in FIG. 10, the blade 201 may be locked into a second position in the blade holder 204, with the blade cylindrical portion 201' located within the first recess 205*a* such that the blade is about 1.5 inches±0.25 inches ($D_2$) from the crimping platform 202. In the second position, the blade 201 is located closer to the crimping platform 202 and therefore may operate on smaller wall jacks. It could be envisioned a tool with more than two, fixed or removable and replaceable, blade locking positions for a plurality of blade to platform positions for numerous sizing of numerous wall jacks accommodating numerous wall jacks on the same tool.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A crimping tool comprising:

a first-class double lever including a first lever and a second lever fixed by a first pivot;

a platform fixed by a second pivot to an end of the first lever and configured to support a wall jack; and a blade holder fixed by a third pivot to an end of the second lever, the blade holder being adjustable to adjust the length of the attached blade with the platform and the blade movable linearly in a direction towards one another when moved in a direction of crimping.

2. The tool of claim 1, wherein the blade holder comprises a half-cylinder extending perpendicular to the platform, the half-cylinder comprising a first recess portion, a second recess portion, and a locking portion between the first and second recess portions.

3. The tool of claim 1, wherein the platform extends perpendicular to the blade holder with a length within a range of about 1.0-1.5 inches and a width within a range of about 0.75-1.25 inches.

4. The tool of claim 1, wherein the platform is configured to fix the wall jack to the platform.

5. The tool of claim 1, further comprising:

a blade inserted into one of the plurality of blade positions of the blade holder, wherein in a first position, the blade is between about 0.50 inches and 1.0 inches from the platform, and in a second position, the blade is between about 1.25 inches and 1.75 inches from the platform.

6. The tool of claim 5, wherein the blade is configured to engage a wire with the wall jack by terminating the wire at the wall jack.

7. The tool of claim 5, wherein the blade is configured to engage a wire with the wall jack by connecting the wire to the wall jack.

8. The tool of claim 5, wherein the blade comprises a cutting blade.

* * * * *